United States Patent

Gore (10) Patent No.: US 10,027,467 B2
(45) Date of Patent: Jul. 17, 2018

(54) COMMUNICATION SYSTEM (71) Applicant: BAE SYSTEMS plc, London (GB)

(72) Inventor: Matthew Robert Gore, Chelmsford (GB)

(73) Assignee: BAE SYSTEMS plc, London (GB)

(*) Notice: Subject to any disclaimer, the term of this patent is extended or adjusted under 35 U.S.C. 154(b) by 0 days.

(21) Appl. No.: 15/523,144

(22) PCT Filed: Oct. 26, 2015

(86) PCT No.: PCT/GB2015/053202
§ 371 (c)(1),
(2) Date: Apr. 28, 2017

(87) PCT Pub. No.: WO2016/067003
PCT Pub. Date: May 6, 2016

(65) Prior Publication Data
US 2017/0317810 A1    Nov. 2, 2017

(30) Foreign Application Priority Data

Oct. 31, 2014   (GB) .................................. 1419420.3

(51) Int. Cl.
*G01V 3/00* (2006.01)
*H04L 5/14* (2006.01)
(Continued)

(52) U.S. Cl.
CPC ............. *H04L 5/1461* (2013.01); *E21B 17/01* (2013.01); *E21B 47/14* (2013.01); *H04L 5/16* (2013.01)

(58) Field of Classification Search
CPC ....... E21B 17/01; E21B 47/14; H04L 5/1461; H04L 5/16
(Continued)

(56) References Cited

U.S. PATENT DOCUMENTS 4,532,812 A * 8/1985 Birchak .................. E21B 21/08
73/152.21
4,562,559 A * 12/1985 Sharp ...................... H04B 11/00
175/40
(Continued)

FOREIGN PATENT DOCUMENTS

EP         0261825 A2    3/1988
EP         0837217 A2    4/1998
(Continued)

OTHER PUBLICATIONS

International Search Report and Written Opinion received for Patent Application No. PCT/GB2015/053204, dated Feb. 12, 2016. 11 pages.
(Continued)

*Primary Examiner* — Joseph Feild
*Assistant Examiner* — Rufus Point
(74) *Attorney, Agent, or Firm* — Finch & Maloney PLLC (57) ABSTRACT

A communication system 100) comprises a first set (204, 206) of transducers and a second set (210, 212) of transducers. The system further comprises a first signal processing device (106) configured to produce a signal for transmission by at least some of the transducers in the first set to at least some of the transducers in the second set, and a second signal processing device (110) configured to process signals received from at least some of the transducers in the second set in order to select a best said signal that is used for further processing. The first set of transducers comprises a first subset (204) comprising at least one said transducer, and a second subset (206) comprising at least one said transducer. Transducers in the first subset transmit on a first channel and transducers in the second subset transmit on a second channel having a different frequency.

20 Claims, 7 Drawing Sheets

(51) Int. Cl.
*E21B 47/14* (2006.01)
*E21B 17/01* (2006.01)
*H04L 5/16* (2006.01)

(58) Field of Classification Search
USPC ............. 340/690, 853.3, 853.1, 853.7, 854.5
See application file for complete search history.

(56) References Cited

U.S. PATENT DOCUMENTS

| | | | |
|---|---|---|---|
| 4,675,852 A | 6/1987 | Russell et al. | |
| 5,081,406 A | 1/1992 | Hughes et al. | |
| 5,592,438 A * | 1/1997 | Rorden | E21B 47/101 340/854.3 |
| 6,648,082 B2 * | 11/2003 | Schultz | E21B 12/02 175/39 |
| 6,837,332 B1 | 1/2005 | Rodney | |
| 7,411,864 B2 * | 8/2008 | Hurst | G01V 1/46 340/853.3 |
| 9,657,563 B2 * | 5/2017 | Schuhrke | E21B 47/09 |
| 2002/0050930 A1 | 5/2002 | Thomeer et al. | |
| 2003/0151977 A1 | 8/2003 | Shah et al. | |
| 2005/0035874 A1 | 2/2005 | Hall et al. | |
| 2006/0221768 A1 | 10/2006 | Hall et al. | |
| 2007/0000667 A1 | 1/2007 | MacKenzie et al. | |
| 2008/0247273 A1 | 10/2008 | Chemali et al. | |
| 2009/0240705 A1 | 9/2009 | Miloushev et al. | |
| 2010/0117855 A1 | 5/2010 | Sinclair et al. | |
| 2010/0149914 A1 * | 6/2010 | Achanta | G01V 1/46 367/34 |
| 2011/0018735 A1 * | 1/2011 | Garcia-Osuna | G01V 11/002 340/854.4 |
| 2011/0176387 A1 | 7/2011 | Froelich | |
| 2012/0170410 A1 | 7/2012 | Hay | |
| 2015/0285065 A1 * | 10/2015 | Howell | E21B 47/0005 367/82 |
| 2017/0317810 A1 * | 11/2017 | Gore | H04L 5/1461 |
| 2017/0317811 A1 * | 11/2017 | Finch | H04L 5/1461 |

FOREIGN PATENT DOCUMENTS

| | | |
|---|---|---|
| EP | 2204530 A1 | 7/2010 |
| EP | 2763335 A1 | 8/2014 |
| GB | 2481699 A | 1/2012 |
| WO | 0033108 | 6/2000 |
| WO | 2013057481 A1 | 4/2013 |
| WO | 2013185064 A1 | 12/2013 |
| WO | 2014011823 A1 | 1/2014 |
| WO | 2014018010 A1 | 1/2014 |
| WO | 2016067003 A1 | 5/2016 |
| WO | 2016067004 A1 | 5/2016 |
| WO | 2016067005 A1 | 5/2016 |

OTHER PUBLICATIONS

Warthman, Forrest, "Delay-and Disruption-Tolerant Networks: A Tutorial," Jul. 23, 2012. Retrieved from the Internet URL: http://ipnsig.org/wp-content/uploads/2012/07/DTN_Tutorial_v2_05.pdf. 35 pages.

Dunn, Shaun, "Subsea Communications for Solving Real World Problems," Mar. 13, 2014. Retrieved from the Internet URL: http://www.oceanologyinternational.com/_novadocuments/49394?v=6. 38 pages.

Heidemann, et al., "Research Challenges and Applications for Underwater Sensor Networking," Wireless Communications and Networking Conference, 2006. Retrieved from the Internet URL: https://www.isi.edu/~johnh/Papers/Heidemann06a.pdf. 8 pages.

Patel, Komal, "Underwater Sensor Networking," IJIRST—International Journal for Innovative Research in Science & Technology, vol. 1, Issue 1, Jun. 2014. pp. 18-21.

International Preliminary Report on Patentability received for Patent Application No. PCT/GB2015/053204, dated May 11, 2017. 8 pages.

International Preliminary Report on Patentability received for Patent Application No. PCT/GB2015/053203, dated May 11, 2017. 10 pages.

International Search Report and Written Opinion received for Patent Application No. PCT/GB2015/053203, dated Apr. 5, 2016. 13 pages.

GB Intellectual Property Office Search Report under Section 17(5) received for GB Patent Application No. 1419421.1 dated Apr. 7, 2015. 3 pages.

GB Intellectual Property Office Search Report under Section 17(5) received for GB Patent Application No. 1419423.7. dated Mar. 10, 2015. 3 pages.

International Search Report and Written Opinion received for Patent Application No. PCT/GB2015/053202, dated Jan. 26, 2016. 12 pages.

GB Intellectual Property Office Search Report under Section 17(5) received for GB Patent Application No. 1419420.3 dated Apr. 7, 2015. 3 pages.

International Preliminary Report on Patentability received for Patent Application No. PCT/GB2015/053202, dated May 11, 2017. 8 pages.

* cited by examiner

Fig. 5

COMMUNICATION SYSTEM

The present invention relates to communication systems and methods.

Some specialised communications systems use transducers for passing signals through a medium, such as water Typically, to achieve suitable interference-free signal strength at the receive transducer, paired transducers need to be positioned such that they are aligned with each other with significant precision. This can be difficult in situations where it is not feasible to precisely position the transducers, and/or where the members to which the transducers are connected move.

An example of this type of difficult environment is an oil rig, where transducers fitted to a mandrel are surrounded by fluid and are moved whilst being docked with respect to the riser.

Embodiments of the present invention are intended to address at least some of the above problems.

According to one aspect of the present invention there is provided a communication system comprising:
 a first set of transducers;
 a second set of transducers;
 a first signal processing device configured to produce a signal for transmission by at least some of the transducers in the first set to at least some of the transducers in the second set;
 a second signal processing device configured to process signals received from at least some of the transducers in the second set in order to select a best said signal that is used for further processing,
 wherein the first set comprises a first subset comprising at least one said transducer, and a second subset comprising at least one said transducer, and
 wherein the at least one transducer in the first subset has a first characteristic (e.g. frequency), and the at least one transducer in the second subset has a second characteristic (e.g. frequency).

In some embodiments, a transceiver unit (for the first set) may comprise a first pair of transducers of the first subset and a second pair of transducers of the second subset. One said transducer in the first pair may be configured to transmit and another said transducer in the first pair may be configured to receive. One said transducer in the second pair may be configured to transmit and another said transducer in the second pair may be configured to receive.

A said transducer in the first subset may transmit on a first channel having an associated first frequency, and a said transducer in the second subset may transmit on a second channel having a second, different associated frequency.

The first signal processing device may be configured to produce the signal so that the signal is transmitted on the first channel by the first subset of transducers in the first set, and transmitted on the second channel by the second subset of transducers in the first set.

The first subset and the second subset of said transducers in the first set may be arranged in an interleaved manner, e.g. spaced apart in a line on/along a first member. A said transducer in the first subset may be spaced apart from an adjacent said transducer in the second subset by a regular distance.

The transducers in the second set may be configured to receive the signals transmitted on the first channel and the second channel.

The second signal processing device may select the best channel based on an error correction metric for data frames comprising the signals. The error correction metric may comprise a Viterbi bit error correction metric.

The transducers in the second set may include a first subset of the transducers and a second subset of the transducers.

The transducers in the first subset of the second set may be arranged in a first radial arrangement, e.g. a full or partial ring/loop around a second member. The transducers in the second subset of the second set may be arranged in a second radial arrangement around the second member, the first and the second radial arrangement being spaced apart axially.

The transducers in first subset of the second set may be configured to transmit the signal on the first channel to the first set of transducers. The transducers in the second subset of the second set may be configured to transmit the signal on the second channel to the first set of transducers.

In some embodiments, a transceiver unit (for the second set) may comprise a first pair of transducers of the first subset and a second pair of transducers of the second subset. One said transducer in the first pair may be configured to transmit and another said transducer in the first pair may be configured to receive. One said transducer in the second pair may be configured to transmit and another said transducer in the second pair may be configured to receive.

The transducers in the first set may be configured to receive the signals transmitted by the transducers in the second set on the first channel and the second channel.

The first signal processing device may be configured to process the signals received by the transducers in the first set on the first channel and the second channel in order to select a best channel from amongst the first and the second channels that is used to produce a first signal processing device output.

The first channel and the second channel may be centred on a predetermined intermediate frequency.

The first signal processing device and the second signal processing device may implement a COFDM modulation scheme for transmitting/receiving the signals.

The first (and/or the second) signal processing device may include a set of common transmitter components that can be used to partially produce the signal that is transmitted on the first channel by the first subset of transducers in the first set, and also to partially produce the signal that is transmitted on the second channel by the second subset of transducers in the first set. The common transmitter components may include a frame processor, an RS encoder, a codeword interleaver, a randomiser, a convolutional encoder and/or an OFDM modulator.

The first (and/or the second) signal processing device may include a set of common receiver components that can be used to partially process the signal that is received on the first channel (by the first/second subset of transducers in the first/second set), and also to partially process the signal that is received on the second channel (by the first/second subset of transducers in the first/second set). The common receiver components may include a codeword de-interleaver, an RS decoder and/or a frame processor.

A said transducer in the first set may convert the signal received from the first signal processing device so that the signal is transmitted acoustically. The transducers in the second set may convert the signal transmitted acoustically by a said transducer in the first set into an electrical signal for the second signal processing device.

The first signal processing device may receive an input signal and process the input signal to produce the signal. The input signal may be received from at least one sensor. The sensor may measure temperature or fluid flow characteristics.

An output of a said signal processing device may be used to control another device, e.g. a motor.

In use. the first set of transducers may be connected to a first member. In use, the second set of transducers may be connected to a second member. In use, at least one of the first and the second members may be moveable relative to one another. The first member may comprise (or be connected to) a mandrel. The second member may comprise (or be connected to) a conduit or riser in which the mandrel may be at least partially located in use. A medium, e.g. fluid, such as water, may, in use, be present or flow, between the first member and the second member (of the first and second sets of transducers).

According to another aspect of the present invention there is provided signal transmitting apparatus comprising:
 a signal processing device configured to produce a signal for transmission by at least some transducers in a first set of said transducers to transducers in a second set of transducers.

According to another aspect of the present invention there is provided signal receiving apparatus comprising:
 a signal processing device configured to receive signals from at least some transducers in a set of transducers and to process the received signals in order to select a best said signal that is used to produce an output from the signal receiving device.

According to another aspect of the present invention there is provided a transceiver unit configured to operate with signal transmitting apparatus, signal receiving apparatus and/or a communications system substantially as described herein.

According to yet another aspect there is provided a set of transceiver units substantially as described herein.

According to another aspect of the present invention there is provided a method of operating a communication system, the method comprising:
 producing a signal for transmission by at least some of a first set of transducers to at least some of a second set of transducers;
 receiving signals from at least some of the transducers in the second set, and
 processing the received signals in order to select a best said signal that is used to produce an output,
 wherein the first set of transducers comprises a first subset comprising at least one said transducer, and a second subset comprising at least one said transducer, and
 wherein the at least one transducer in the first subset transmits on a first channel having an associated first frequency, and the at least one transducer in the second subset transmits on a second channel having a second, different associated frequency.

According to yet another aspect of the present invention there is provided a method of transmitting data in a communication system, the method comprising:
 producing a signal for transmission by at least some of a first set of transducers to at least some of a second set of transducers, and
 transmitting the signal using at least some of the first set of transducers.

According to yet another aspect of the present invention there is provided a method of processing data received in a communication system, the method comprising:
 receiving signals from a set of transducers;
 processing the received signals in order to select a best said signal that is used to produce an output.

According to another aspect, the invention provides a signal processing device substantially as described herein. According to yet another aspect, the invention provides a transceiver unit substantially as described herein.

According to a general aspect of the present invention there is provided a communication system comprising:
 a first set of transducers;
 a second set of transducers;
 a first signal processing device configured to produce a signal for transmission by at least some of the transducers in the first set to at least some of the transducers in the second set;
 a second signal processing device configured to process signals received from at least some of the transducers in the second set in order to select a best said signal that is used for further processing.

According to yet another aspect of the present invention there is provided a mandrel including, or connected to, at least some components of a communications system substantially as described herein. According to yet another aspect of the present invention there is provided a riser including, or connected to, at least some components of a communications system substantially as described herein.

According to further aspects of the present invention there are provided computer-readable storage medium including instructions that, when executed on a processor, causes the processor to perform methods substantially as described herein.

BRIEF DESCRIPTION OF THE FIGURES

For a better understanding of the invention, and to show how embodiments of the same may be carried into effect, reference will now be made, by way of example, to the accompanying diagrammatic drawings in which.

DETAILED DESCRIPTION OF THE FIGURES

Figure 1:
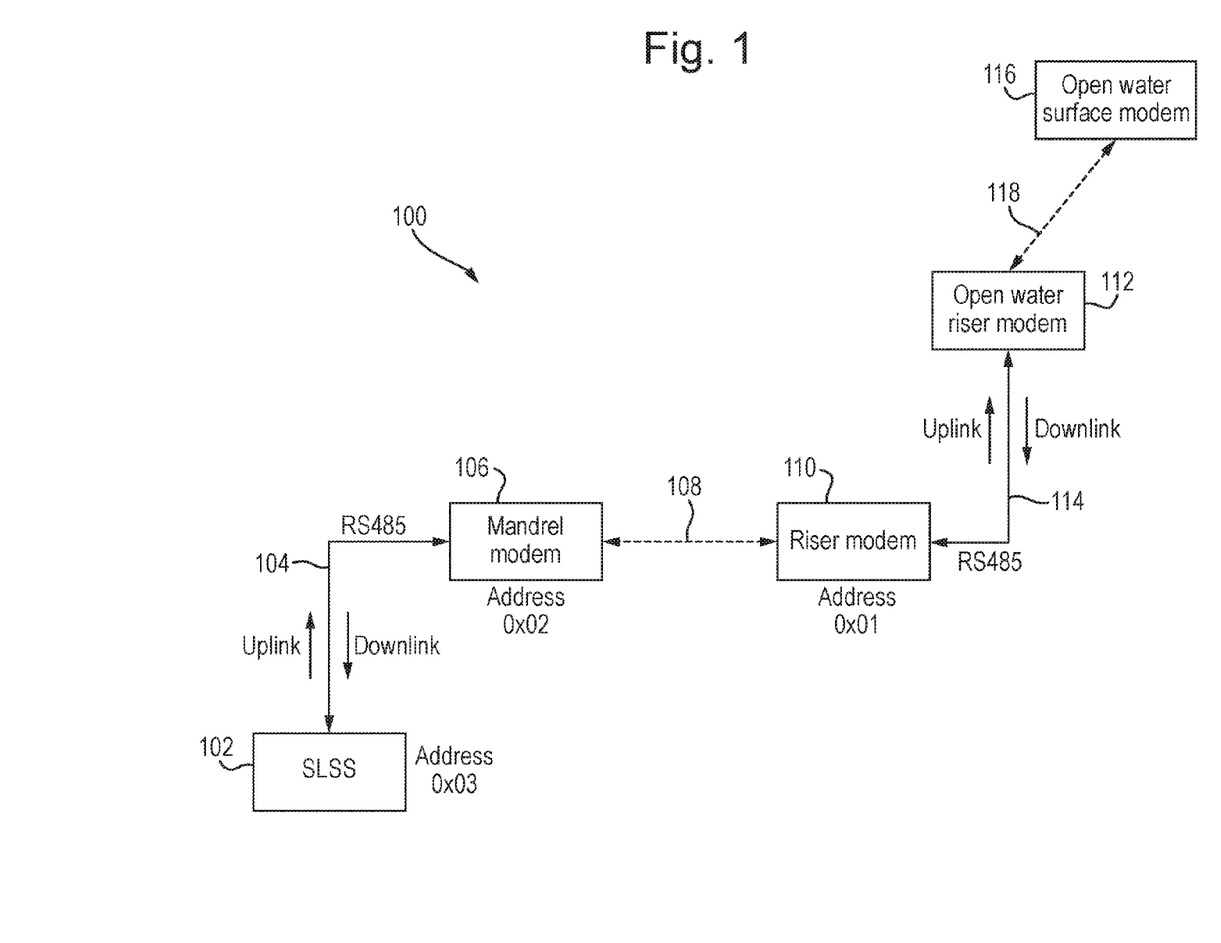
FIG. 1 is a schematic overview of an example communication system including first and second data processing devices that are in communication via an acoustic link provided by various sets of transducers.

Referring to FIG. 1, a schematic overview of an example communication system 100 is shown. The example system comprises a Subsea Landing String System (SLSS) 102 that communicates via an RS485 link 104 with a modem 106 located on a mandrel. An acoustic link 108 provided by transducers (not shown in FIG. 1) allows communication between that modem and another modem 110 located on a riser. The riser modem is in communication with an open water riser modem 112 via an RS485 link 114. That open water riser modem is in communication with a further open water surface modem 116 via an open water link 118.

In the example system, the RS485 is a half-duplex communications link using the known MODBUS serial transmission Remote Terminal Unit (RTU) protocol, operating in unicast mode with matching requests and replies. The RS485 link is set for 19200 baud, even parity, 1 start and 1 stop bit. In a typical example operation, the open water surface modem 116 can request data from the SLSS 102 (e.g. a temperature, fluid flow rate or other characteristic measurement taken by a sensor that is on board (or is in communication with) the SLSS), with the request being transferred via the illustrated components and links in sequence, and the response data being transferred back in a reverse manner.

It will be appreciated that the illustrated communication system's application, links and components are exemplary only. In general, the communications system may include any configuration of data processing components that include/use transducers, typically (but not limited to) ones that can communicate via acoustic links through fluid. Generally, the system will need to provide communication between a first data processing device that is associated with at least one transducer, and a second data processing device that is associated with its own transducer(s). Each transducer may be connected to a member that may or may not be moveable relative to one another. The communication may be unidirectional or bidirectional.

Figure 2:
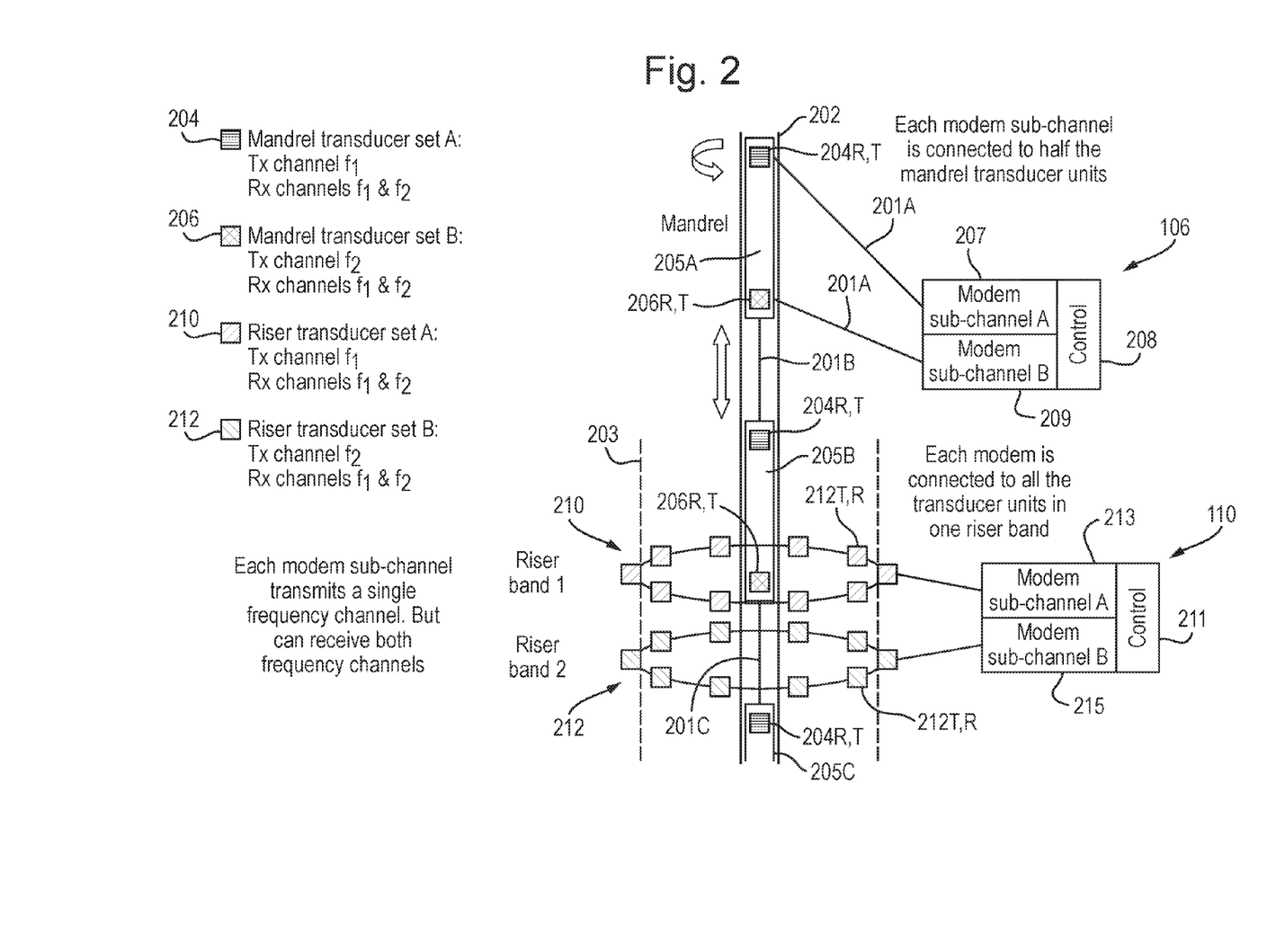
FIG. 2 details parts of the system including the first and second data processing devices and the transducer sets.

FIG. 2 shows the mandrel modem 106, the riser modem 110 and associated components in more detail.

The mandrel modem 106 is in communication with a first set of transducers (not detailed in FIG. 1) that are connected to the mandrel 202. The mandrel modem may be connected to the mandrel itself or to another body. The transducers in this first set are contained in a plurality of transceiver units 205A, 205B, 205C mounted along a 10 m straight length of the external surface of the mandrel. It will be understood that the precise number and arrangement of the transceiver units can vary, but typically there will be regular spacing between adjacent pairs of transducers/transceiver units. The connection of the transducers to the mandrel may be achieved by any suitable means, e.g. waterproof adhesive, fixings, etc, or the mandrel (or part thereof) may be manufactured with the transducers as integral parts.

In the example embodiment the first set of mandrel transducers is divided into first 204 and second 206 subsets. The mandrel modem 106 provides a first sub channel 207 so that the first subset 204 of transmit transducers are configured to transmit on a first frequency $f_1$. The mandrel modem also provides a second sub channel 209 so that the second subset 206 of transmit transducers are configured to transmit on a second, different frequency $f_2$. The receive transducers of the first subset and the second subset can receive on both frequencies $f_1$ and $f_2$.

Each transceiver unit 205 comprises a housing, typically in the form of a rectangular box having front, back, first end, opposite end, first side and opposite side surfaces, although it will be appreciated that the dimensions and design can be varied. There is a pair of transducers at/adjacent each (opposing) end of the transceiver unit: one transducer in the pair functioning as a transmitter and the other transducer in the pair functioning as a receiver. The pair of transducers at one end will normally be in the first subset and the pair of transducers at the other end in the second subset. For example, the transceiver unit 205A comprises a transducer pair 204T, 204R (of the first subset) at one end, and a transducer pair 206T, 206R (of the second subset) at its other end. Thus, in the example system, the first 204 and second 206 subsets of the mandrel transducers are arranged in a line as two interleaved groups along the mandrel. Each transducer may be manufactured from a single piezoelectric element, although in other embodiments, different types of transducers may be used. Each transducer may have an associated amplifier.

The mandrel modem 106 is connected to a first of the transceiver unit 205A by means of a first cable 201A. For ease of illustration, the cable 201A is illustrated by means of two lines in the Figure, but it will be understood in practice that a single cable may extend between the modem and the transceiver unit, which may be split for connection to the transducers 204T, 204R, 206T, 206R within the unit.

The first transceiver unit 205A is connected to the second transceiver unit 205B by means of a second cable 201B. That second transceiver unit is connected to a third transceiver unit 205C by means of a third cable 201C. Thus, the mandrel modem 106 is connected to a "daisy-chain" of transceiver units by means of respective cables. It will be understood that the number and arrangement of transceivers/cables is exemplary only and in other embodiments different numbers and/or arrangements of transceivers/cables could be used. Further, all the transceivers/cables need not be of exactly the same type/design. In other applications, the communication may be via wired medium. In alternative embodiments at least part of the functionality of the modems described herein may be implemented by components integral with a transducer transceiver (or transmitter/receiver) unit.

The mandrel modem 106 can include a controller 208 including components as described below, and may receive at least one input from at least one external device, e.g. a temperature sensor. Such an input can form the basis of a signal to be transmitted by the modem. Output produced as a result of signal processing by the mandrel modem may be processed internally, or stored and/or transferred as finalised data for further processing by another device. In some cases, the output produced by a component of the system may be used to control a device, such as a motor.

Although the detailed example described herein uses two subsets of transducers, with each subset being configured to transmit on a different frequency, it will be understood that variations are possible in other embodiments. For example, more than two subsets of transducers could be provided, with the processing of the system being modified to select a best link from between the three subsets. Alternatively or additionally, the transducers in a particular subset could share a distinguishing characteristic other than a common transmission frequency that can be used as part of a link selection process.

The riser modem 110 is connected to a second set of transducers that are connected to the riser 203. Again, the communication and connection means can comprise any suitable technology. In the example embodiment this second set of riser transducers is divided into first 210 and second 212 subsets. The first 210 and second 212 subsets of riser transducers are arranged in the form of first and second, respectively, closely spaced bands/loops/rings on the external surface of the riser 203. Although not fully illustrated for reasons of clarity, a transceiver unit mounted on the riser will comprise one pair of transducers in the subset 210 and a corresponding (in terms of radial position) pair of transducers in the subset 212. For example, the transducer pair labelled 210T, 210R and the transducer pair labelled 212T, 212R can be located at opposing ends of one riser transceiver unit. Other riser transceiver units are not labelled in this way in the Figure.

The riser modem 110 provides a first sub channel 213 so that the first subset 210 of riser transmit transducers are configured to transmit on a first frequency $f_1$ (which, in the example embodiment, is the same as the frequency $f_1$ used by the first subset 204 of the mandrel transducers). The riser modem also provides a second sub channel 215 so that the second subset 212 of riser transmit transducers are configured to transmit on the second frequency $f_2$ (which, again, in the example embodiment, is the same as the frequency $f_2$ used by the second subset 206 of the mandrel transducers). The receive transducers of the first subset and the second subset can receive on both frequencies $f_1$ and $f_2$.

The use of the two modem sub-channels on both the mandrel 202 and riser 203 allows greater separation of interfering transducers. The riser modem 110 can include a controller 211 including components as described below, and may receive at least one input from at least one external device. Output produced by the riser modem may be processed internally, or stored and/or transferred for further processing by another device, e.g. a remote device that is in communication with the open water surface modem 116.

The example modem design is based on a Coded Orthogonal Frequency Division Multiplex (COFDM) approach. COFDM provides a rugged solution to transmitting digital data at high rates through an environment where multipath signals with different times of arrival produce significant signal interference. The use of COFDM and the mounting of transceivers on the riser pipe can avoid the need to machine surfaces, such as the riser pipe, because of the large signal variation that is possible.

It will be understood that the illustrated arrangement of transducers is exemplary only and alternatives are possible, e.g. in some cases a different arrangement, e.g. open loop or grid, may be used. Similarly, in the case where more than two different frequencies are used in the system, a corresponding number of subsets/groups can be provided.

As illustrated by the arrows in FIG. 2, during docking, as the mandrel 202 is lowered into the riser 203, several transducers 204, 206 on the mandrel address several transducers 210, 212 on the riser, whilst rotation of the mandrel about its axis is uncontrolled. Fluid will usually surround/flow between the mandrel and the riser. Individual transceiver units provide communications coverage for approximately +/−20° rotation and +/−80 mm linear relative motion. A ring of up to 10 units in each riser band/subset 210, 212 can provide 360° coverage and 30 mandrel transceivers in each of the interleaved arrays 204, 206 on the mandrel can provide a large linear operational range (up to 10 m). This can allow the example system to start communicating around 10 m above final fixed/docked position and does not require angular alignment.

The two sub-channels 207, 209; 213, 215 in both the mandrel 106 and the riser 110 modems can be combined into a single hardware unit. As will be described below in more detail, a logical connection between the two sub-channels can be used on the receive side to select the data with the best performance.

The use of two interleaved mandrel transducer groups can accommodate the use of Frequency Division Multiple Access (FDMA) with two frequency channels, one for each group. This allows greater separation of interfering transducers to overcome the problem of modems receiving signals with both positive and negative Doppler during the mandrel docking procedure and to reduce the effect of nulls introduced by the severe multi-path environment. The two channels can be centred on a chosen Intermediate Frequency (IF), based on the characteristics of the transducers and/or operating environment, e.g. fluid type/density. The same data is transmitted on both frequencies, but the link is made by different transducers. In both communications directions, individual transducers transmit on a single frequency channel ($f_1$ or $f_2$) and receive on both channels ($f_1$ and $f_2$). It will be understood that in alternative embodiments, e.g. ones that do not use a request/response protocol, the data transfer could be unidirectional, e.g. from the mandrel to the riser only.

Although multiple frequencies are used in the example embodiment, the overall communications channel will be half-duplex and therefore there will still be Time Division Multiplexing (TDM) between the two communication directions. This can remove the problem of using simultaneous transmit and receive frequencies and the problems of the transmitted signals swamping the receiver.

Figure 3:
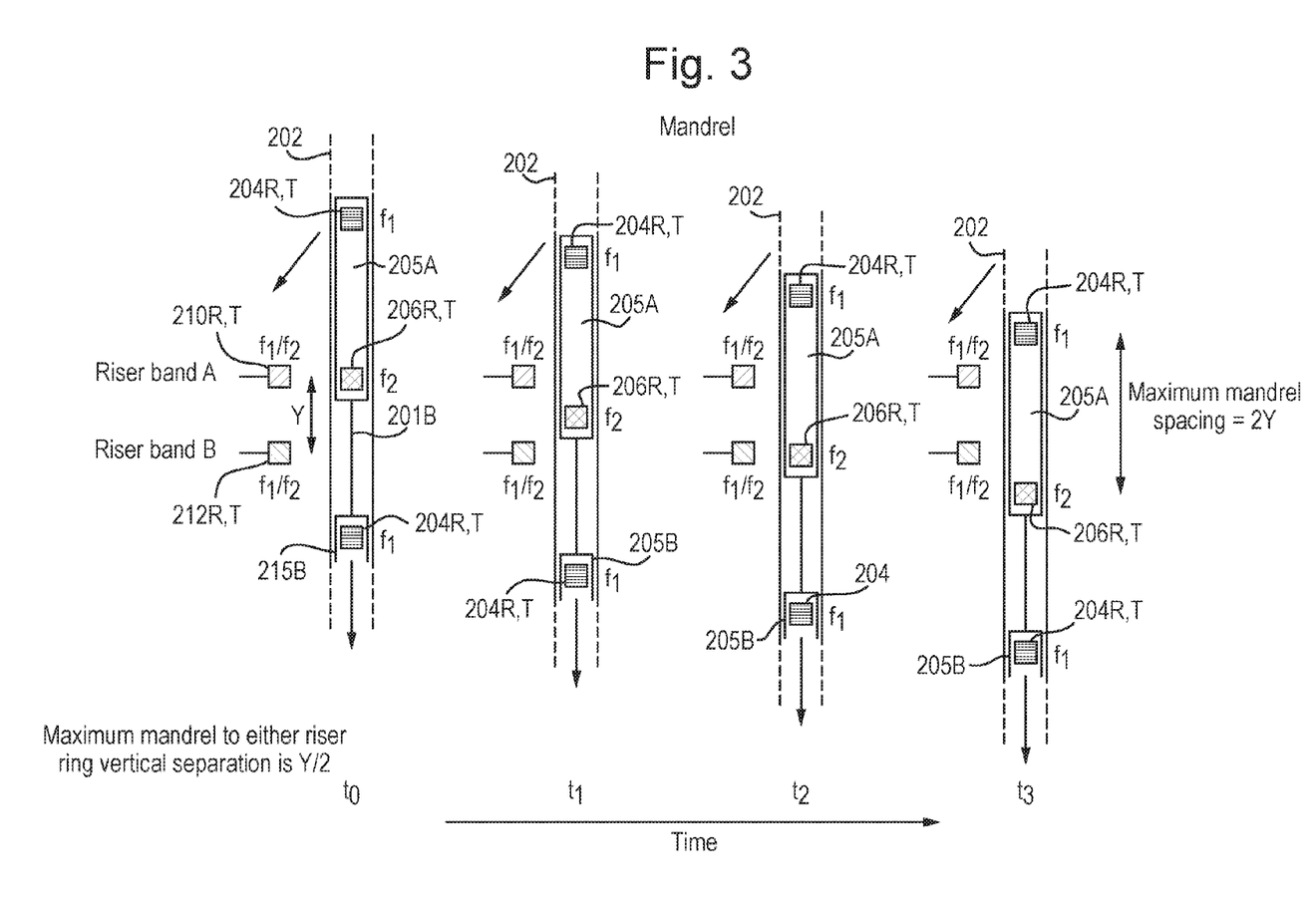
FIG. 3 schematically illustrates data transfer from the first data processing device and its associated transducer sets to the second data processing device and its associated transducer sets.

FIG. 3 schematically illustrates communication in the mandrel 202 to riser 203 direction as the mandrel is lowered. It also illustrates the maximum mandrel transducer 204, 206 spacing of 2Y, given a riser transducer band 210, 212 separation of Y and a maximum mandrel to riser vertical misalignment of Y/2. In preferred embodiments, the vertical spacing between the transducers on the mandrel and those on the riser is equal (i.e. Y).

As discussed above, the mandrel transducers are separated into two interleaved subsets/groups 204, 206 (within transceiver units 205) along a length of the mandrel 202. Each group/subset transmits on only one of the frequencies $f_1$ or $f_2$. The two riser modem sub-channels 213, 215 receive both frequencies $f_1$ and $f_2$ via the bands/subsets 210, 212 of riser transducers. This can overcome the problem of two transducers at the same range with opposite Doppler, as it is assumed that for the frequency forming the best link, only a maximum of one transducer from that subset makes any significant contribution to the communications channel at any particular time due to spatial separation and the associated propagation attenuation.

Figure 4:
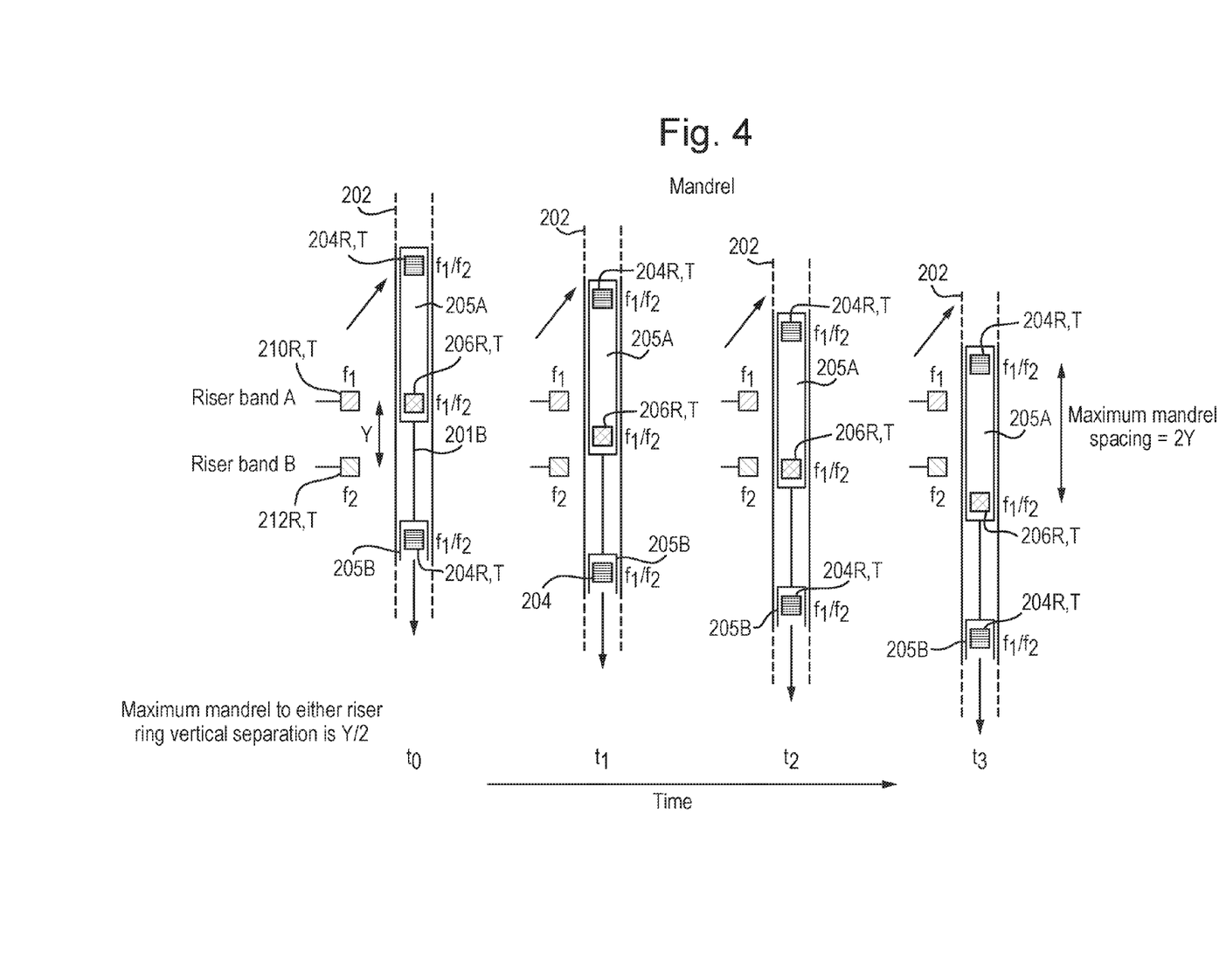
FIG. 4 schematically illustrates data transfer from the second data processing device and associated transducer sets to the first data processing device and associated transducer sets.

FIG. 4 schematically illustrates communication in the riser 203 to mandrel 202 direction. It also shows the maximum mandrel transducer 204, 206 spacing of 2Y, given a riser transducer band 210, 212 separation of Y and a maximum mandrel to riser vertical misalignment of Y/2. In preferred embodiments, the vertical spacing between the transducers on the mandrel and those on the riser is equal (i.e. Y).

As discussed above, the riser transducers transmit on different frequency channels $f_1$ or $f_2$ from each riser band/subset 210, 212, respectively. The mandrel modem 106 receives on both frequency channels $f_1$ and $f_2$ via the mandrel transducers in the respective subsets 204, 206.

Demodulating two channels is achieved by splitting the channels in the digital processing performed by the modems 106, 110. Although this requires extra digital processing power (approaching double that of a single channel), it has a number of significant advantages in terms of system and communications performance, including:

It is required for the riser to mandrel direction to overcome the Doppler problem It allows the greatest spatial separation of interfering transmissions from other transducers using the same channel Transmitting on a single frequency channel gives the best performance, as all the signal power may be dedicated to a signal channel Modems for the mandrel and riser have common functionality The use of separate frequencies and the different positioning of the transducers can reduce the possibility of nulls in one part of the system.

Figure 5:
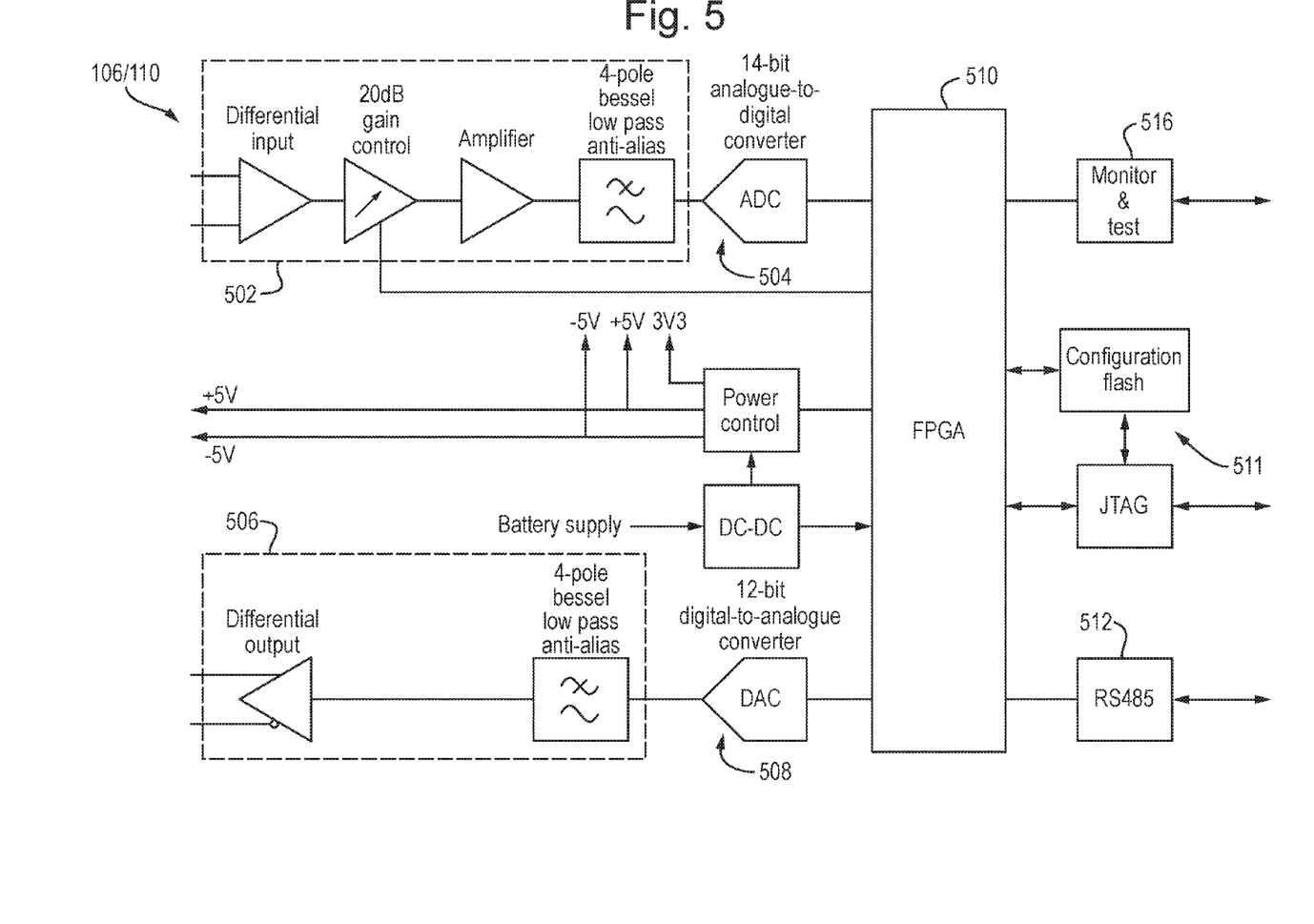
FIG. 5 is a block diagram of one of the data processing devices.

FIG. 5 shows an example of the electronic components used for the mandrel 106 or riser 110 modem. The example modem comprises: an analogue front end 502; analogue to digital converter 504; analogue back end 506; digital to analogue converter 508; FPGA 510 and supporting configuration components 511; RS485 interface 512; DC-DC converters and power control 514, and monitoring and test interfaces 516. The analogue front end 502 and back end 506, as well as the ADC converter 504 and the DAC converter 508, are each duplicated, one for each of the two transceivers subsets 204, 206; 210, 212 on the mandrel 202 and the riser 203.

Figure 6:
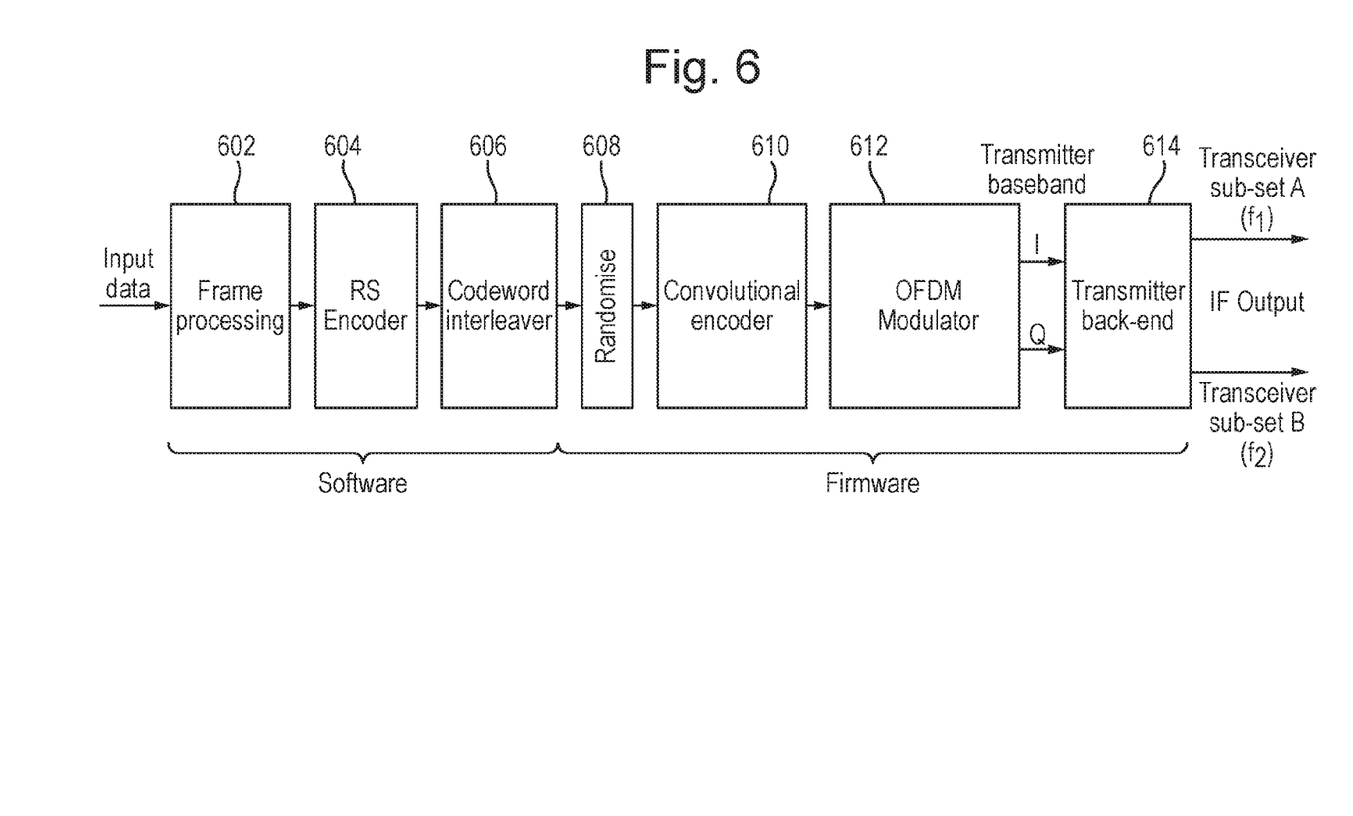
FIG. 6 is a block diagram of the transmitter functionality of the FGPA part of the data processing device.

FIG. 6 shows the COFDM transmitter part within the FPGA 510 of the mandrel/riser modem 106/110. It also identifies the boundary between the firmware and the software within the FPGA. For the transmitter, the data to be transmitted is the same for both channels; there is only a single instance of functionality at the final stage of the back-end 614 where the common signal is finally separated into the two frequency channels.

In the case of the transmitter function of the mandrel modem 106, an input signal may be received via the RS485 from an external source (e.g. a sensor connected to the modem controller 208) that is to form the basis of the transmitted signal. Alternatively, the transmitted signal could be based on a value stored in, or computed by a processor, in the modem or some other connected device. The input is read by the FPGA 510, which provides frame processing 602, RS encoding 604 and codeword interleaving 606 functions in software. It then provides randomise 608, convolutional encoding 610, OFDM modulation 612 and transmitter back-end 614 (which interfaces with the DAC 508) functions in firmware. The OFDM modulation function outputs the signal, via the digital-to-analogue converter 508, to the analogue transmitter back end 506, which causes the processed signal to be transmitted by at least one mandrel transducer 204 in the first subset at frequency $f_1$, or by at least one mandrel transducer 206 in the second subset at frequency $f_2$.

In the case of the transmitter function of the riser modem 110, an input signal is received by the FPGA 510 and processed as above so that the OFDM modulation function 612 outputs the signal via the FPGA transmitter back-end 614, which splits the signal into two, one on each channel $f_1$ and $f_2$, to digital-to-analogue converter 508. The analogue transmitter back end 506 then causes the processed signal to be transmitted by at least one riser transducer 210 in the first subset at frequency $f_1$, or by at least one riser transducer 212 in the second subset at frequency $f_2$. It will be understood that in other embodiments, the described functions may be replaced by others that are suitable for implementing a different transfer protocol or the like. Also, the functions may be implemented by different software/firmware means.

Figure 7:
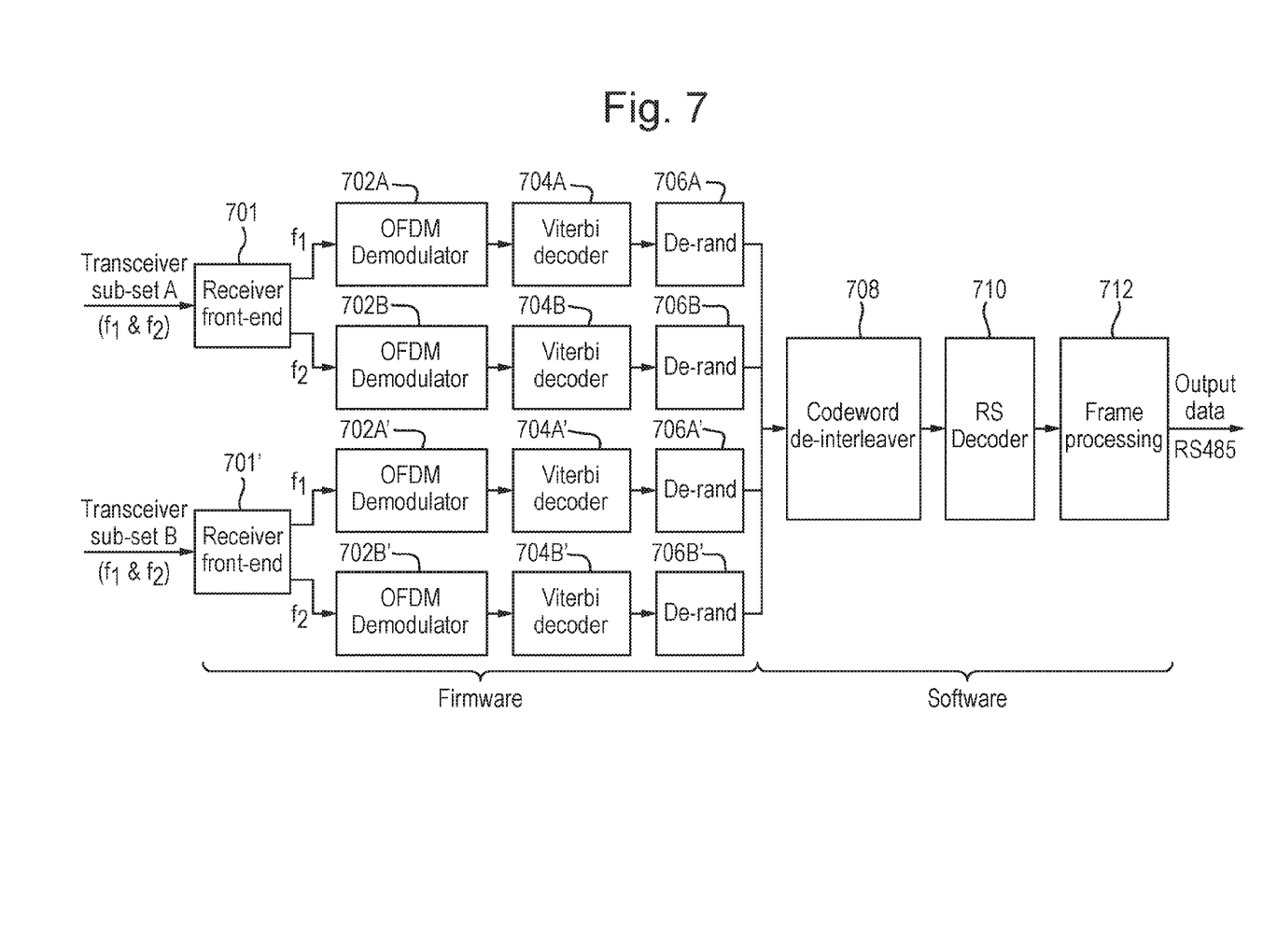
FIG. 7 is a block diagram of the receiver functionality of the FGPA part of the data processing device.

FIG. 7 shows the COFDM receiver part within the FPGA of the mandrel/riser modem 106/110. It also identifies the boundary between the firmware and the software within the FPGA. There is less commonality in the receiver than in the transmitter. Due to the high processing requirements, there are separate receiver front-ends accommodating both frequency channels from either transducer subset, and individual ODFM demodulators and decoding chains for the four channels prior to a Reed-Solomon decoder. However, for part of the demodulator, the Viterbi decoding and de-randomising (although required on each channel), it is possible to use the same actual firmware resources for all channels, by time separating the data in these elements.

In the case of the receiver function of the riser modem 110, an input signal is received by an analogue receiver back end 502 provided for each of the riser transducer band/subsets 210, 212 is passed, via analogue-to-digital converter 504, to a digital receiver front-end function 701 in the FPGA 510, where the frequencies $f_1$ and $f_2$ are isolated. For instance, a signal received by a riser transducer in group/subset 210 at frequency $f_1$ is then processed by OFDM demodulation 702A, Viterbi decoding 704A and de-randomising 706A functions provided in firmware. A signal received by a riser transducer in the group/subset 210 at frequency $f_2$ is received via the receiver front-end function 701 and then processed by OFDM demodulation 702B, Viterbi decoding 704B and de-randomising 706B functions provided in firmware. Corresponding firmware functions 701A'-706A' and 701B'-706B' are also provided for signals received from riser transducers in group/subset 212 at frequency $f_1$ and frequency $f_2$, respectively.

Following function 706A, 706B, 706A' or 706B', the signal is processed using codeword de-interleaver 708, RS decoder 710 and frame processing 712 functions provided in software. Data can be processed in complete acoustic frames, with the selection of the best communications link being established using the Viterbi bit error correction metric obtained from the Viterbi decoder function, based on the number of corrected bits. For example, if the signal received by a riser transducer in the group/subset 210 at frequency $f_2$ is found to have the fewest corrected bits compared to the other received signals then that is selected as the best communications link. The selected best frame can then be passed for further processing within the software portion of the FPGA functionality (or stored/transferred for further processing by some other device).

In the case of the receiver function of the mandrel modem 106, an input signal is received by an analogue receiver back end 502 provided for each of the mandrel transducer band/subsets 204, 206 is passed, via an analogue-to-digital converter 504, to the FPGA 510 and processed in a manner similar to that described above. It will be understood that in other embodiments, the described functions may be replaced by others that are suitable for implementing a different transfer protocol or the like. Also, the functions may be implemented by different software/firmware means.

It will be apparent to the skilled person that the examples described herein can be combined or adapted in various ways to satisfy the needs of any particular application.

At least some embodiments of the invention may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the example embodiments have been described with reference to the components, modules and units discussed below, such functional elements may be combined into fewer elements or separated into additional elements.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A communication system comprising:
   a first set of transducers;
   a second set of transducers;
   a first signal processing device configured to produce a signal for transmission by at least some of the transducers in the first set to at least some of the transducers in the second set;
   a second signal processing device configured to process signals received from at least some of the transducers in the second set in order to select a best signal of said signals that is used for further processing;
   wherein the first set of transducers comprises a first subset comprising at least one said transducer, and a second subset comprising at least one said transducer,
   wherein the first subset and the second subset of said transducers in the first set are arranged in an interleaved manner, and
   wherein the at least one transducer in the first subset transmits on a first channel having an associated first frequency, and the at least one transducer in the second subset transmits on a second channel having a second, different associated frequency.

2. The communication system according to claim 1, wherein the first signal processing device is configured to produce the signal so that the signal is transmitted on the first channel by the first subset of transducers in the first set, and transmitted on the second channel by the second subset of transducers in the first set.

3. The communication system according to claim 1, wherein the first subset and the second subset of said transducers in the first set each include multiple transducers each include multiple transducers.

4. The communication system according to claim 1, wherein the transducers in the second set are configured to receive the signals transmitted on the first channel and the second channel.

5. The communication system according to claim 4, wherein a said transducer in the first subset is spaced apart from an adjacent said transducer in the second subset by a regular distance.

6. The communication system according to claim 4, wherein the second signal processing device is configured to select the best signal based on an error correction metric for data frames comprising the signals.

7. The communication system according to claim 1, wherein the transducers in the second set include a first subset of the transducers and a second subset of the transducers, wherein the transducers in the first subset of the second set are arranged in a first radial arrangement around a second member and the transducers in the second subset of the second set are arranged in a second radial arrangement around the second member, the first and the second radial arrangement being spaced apart axially.

8. The communication system according to claim 7, wherein the transducers in first subset of the second set are configured to transmit the signal on the first channel to the first set of transducers and the transducers in the second subset of the second set are configured to transmit the signal on the second channel to the first set of transducers.

9. The communication system according to claim 8, wherein the transducers in the first set are configured to receive the signals transmitted by the transducers in the second set on the first channel and the second channel, and the first signal processing device is configured to process the signals received by the transducers in the first set on the first channel and the second channel in order to select a best channel from amongst the first and the second channels that is used to produce a first signal processing device output.

10. The communication system according to claim 1, wherein the first signal processing device comprises a set of transmitter components for producing the signal that is transmitted on the first channel by the first subset of transducers in the first set, and also to produce the signal that is transmitted on the second channel by the second subset of transducers in the first set.

11. The communication system according to claim 1, wherein the first signal processing device includes a set of receiver components for processing the signal that is received on the first channel, and also to process the signal that is received on the second channel.

12. The communication system according to claim 1, wherein a said transducer in the first set converts the signal received from the first signal processing device so that the signal is transmitted acoustically.

13. The communication system according to claim 1, wherein, in use, the first set of transducers are connected to a first member and, in use, the second set of transducers are connected to a second member, wherein at least one of the first and the second members is moveable relative to the other.

14. The communication system according to claim 1, where, in use, the first set of transducers is connected to a first member and, in use, the second set of transducers is connected to a second member, wherein the first member comprises a mandrel and the second member comprises a conduit or riser in which the mandrel is at least partially located in use.

15. A method of operating a communication system, the method comprising:
   producing a signal for transmission by at least some of a first set of transducers to at least some of a second set of transducers;

receiving signals from at least some of the transducers in the second set; and processing the received signals in order to select a best signal of said signals that is used to produce an output;

wherein the first set of transducers comprises a first subset comprising at least one said transducer, and a second subset comprising at least one said transducer, wherein the first subset and the second subset of said transducers in the first set are arranged in an interleaved manner, and wherein the at least one transducer in the first subset transmits on a first channel having an associated first frequency, and the at least one transducer in the second subset transmits on a second channel having a second, different associated frequency.

16. The method according to claim 15, wherein the best signal is selected based on an error correction metric for data frames comprising the signals.

17. The method according to claim 15, wherein the received signals are transmitted acoustically.

18. The method according to claim 15, wherein, in use, the first set of transducers are connected to a first member and, in use, the second set of transducers are connected to a second member, wherein at least one of the first and the second members is moveable relative to another.

19. The method according to claim 15, where, in use, the first set of transducers is connected to a first member and, in use, the second set of transducers is connected to a second member, wherein the first member comprises a mandrel and the second member comprises a conduit or riser in which the mandrel is at least partially located in use.

20. A non-transitory computer-readable storage medium encoded with instructions that when executed by one or more processors cause a process to be carried out for operating a communication system, the process comprising:

producing a signal for transmission by at least some of a first set of transducers to at least some of a second set of transducers;

receiving signals from at least some of the transducers in the second set; and processing the received signals in order to select a best signal of said signals that is used to produce an output;

wherein the first set of transducers comprises a first subset comprising at least one said transducer, and a second subset comprising at least one said transducer, wherein the first subset and the second subset of said transducers in the first set are arranged in an interleaved manner, and wherein the at least one transducer in the first subset transmits on a first channel having an associated first frequency, and the at least one transducer in the second subset transmits on a second channel having a second, different associated frequency.

\* \* \* \* \*